US008994730B2

(12) United States Patent
Breeds et al.

(10) Patent No.: US 8,994,730 B2
(45) Date of Patent: Mar. 31, 2015

(54) OPTIMIZING EDGE CROSSING COMPUTATIONS WHEN CREATING A DRAWING OF A DIRECTED GRAPH HAVING A MINIMUM NUMBER OF EDGE CROSSINGS

(75) Inventors: Robert J. Breeds, Swindon (GB); Philip R. Taunton, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1853 days.

(21) Appl. No.: 12/237,614

(22) Filed: Sep. 25, 2008

(65) Prior Publication Data

US 2010/0073375 A1    Mar. 25, 2010

(51) Int. Cl.
  *G06T 11/20*    (2006.01)
  *G06T 17/00*    (2006.01)
(52) U.S. Cl.
  CPC ...................................... *G06T 17/00* (2013.01)
  USPC .......................................................... 345/440
(58) Field of Classification Search
  USPC .......................................................... 345/440
  See application file for complete search history.

(56) References Cited

U.S. PATENT DOCUMENTS

| 7,318,199 | B2 * | 1/2008 | Nickolayev et al. | 715/735 |
| 7,714,862 | B1 * | 5/2010 | Dwyer et al. | 345/440 |
| 2007/0185910 | A1 | 8/2007 | Koike et al. | |
| 2010/0060643 | A1 * | 3/2010 | Kolipaka et al. | 345/440 |

OTHER PUBLICATIONS

Michael Forster. 2002. "Applying Crossing Reduction Strategies to Layered Compound Graphs.", In Revised Papers from the 10th International Symposium on Graph Drawing (GD '02), Springer-Verlag, London, UK, 276-284.*
Jason Reynolds, "A Hierarchical layout Algorithm for Drawing Directed Graphs", Thesis submitted to the Department of Comp. Science, Queen's University, Kingston, Ontario CA, 1997.*
Ivor Horton, "Ivor Horton's Beginning Visual C++", Hoboken, N J, Wrox, 2008.*
Eades, P., "Graph Drawing Methods", Conceptual Structures: Knowledge Representation as Interlingua: 4th Edition., pp. 40-49, Springer, 1996.
Stedile, Alexander, "JMF Graph—A Modular Framework for Drawing Graphs in Java," Master's Thesis, Graz University of Technology, Nov. 18, 2001.

* cited by examiner

Primary Examiner — Maurice L McDowell, Jr.
(74) Attorney, Agent, or Firm — Patents on Demand P.A.; Brian K. Buchheit; Scott M. Garrett

(57) ABSTRACT

A candidate graph crossing point counter can be initialized. Level pairs can be sorted in descending order according to a number of connections between the level pairs. Evaluation of the candidate graph can progress according to the order of the level pairs so that those pairs likely to have the greatest number of connections are processed first. While the candidate graph crossing point counter is at an intermediate value and before a crossing point total is calculated for the candidate graph, it can be determined that the intermediate value is at least as great as a crossing point total of a best current graph for the directional graph. Calculation of the candidate graph crossing point total can be halted at the intermediate value. The candidate graph can be discarded from a possibility of being a minimized graph during a determination of a graph drawing for the directional graph.

17 Claims, 2 Drawing Sheets

100

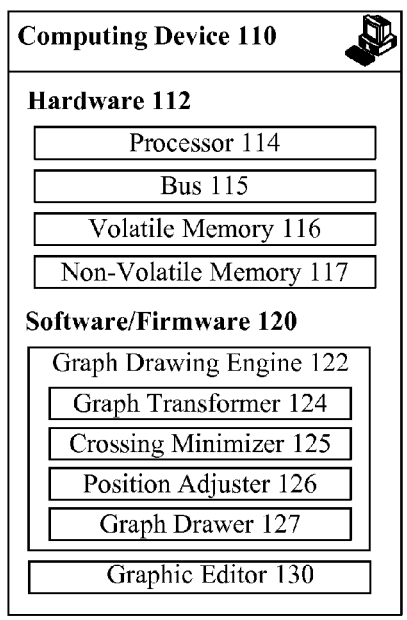

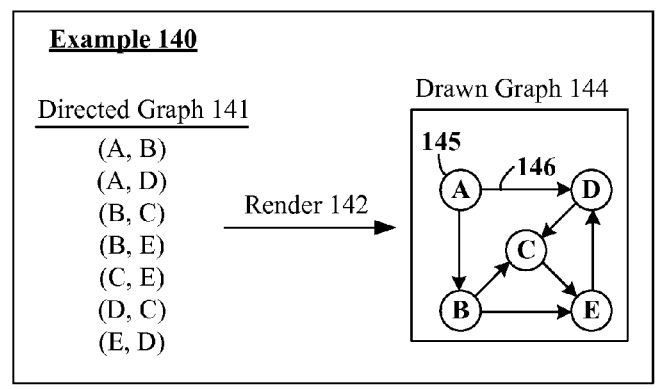

Example 140

Directed Graph 141
(A, B)
(A, D)
(B, C)    Render 142
(B, E)
(C, E)
(D, C)
(E, D)

Drawn Graph 144

---

Sample Code 160

For a graph that is represented as a list of pairs of levels, (i.e., level pair 0 is level 0 and level 1, level pair 1 is level 1 and level 2, etc.)

make a clone of the list of level pairs
for each level pair in the list of level pairs:
    count the number of connections between the two levels
    assign the number of connections to the level pair
} end for

---

Sample Code 165

Using the sorted level pairs from stage 1:

set total number of crossings for candidate to 0
for each level pair in the graph:
    count the number of crossings between the two levels
    add the number of crossings to the total number of crossings
    if the total number of crossings exceeds the number of crossings for the best graph exit
    loop
} end for

FIG. 1

OPTIMIZING EDGE CROSSING COMPUTATIONS WHEN CREATING A DRAWING OF A DIRECTED GRAPH HAVING A MINIMUM NUMBER OF EDGE CROSSINGS

BACKGROUND

The present invention relates to the field of graph rendering and, more particularly, to optimizing edge crossing computations when creating a drawing of a directed graph having a minimum number of edge crossings.

One objective of software that draws directed graphs or digraphs is to produce a graph that is easy to comprehend and that is aesthetically pleasing. One factor that influences the clarity of a directed graph is a number of crossings of edges between nodes, where fewer crossings generally results in superior clarity. Minimizing a number of crossings of edges, however, is a difficult mathematical problem, which is non-deterministic (e.g., NP-hard) in nature. Solutions (e.g., Sugiyama algorithm) to minimize crossings of edges use heuristic methods to refine graph structures, which are generally easy to compute and result in graphs with acceptably low numbers of edge crossings. One of the time consuming aspects of this type of approach is to determine the total number of edge crossings for the entire graph, which is repeated for a large number of possible graphs, referred to as candidate graphs.

The Sugiyama algorithm initially changes a graph into a "proper" hierarchical graph that has no cycles, and only has edges between adjacent levels. That is, cycles are removed from the graph by reversing and marking edges that cause cycles and inserting dummy nodes to ensure that no edges span more than one node. Each pair of levels in the layered graph is taken sequentially and a connection matrix is calculated, with which a number of crossings can be computed. A count for each pair of levels is accumulated and a total of crossing counts for each level pair is taken as the total number of edge crossings for the graph.

The Sugiyama algorithm includes steps that perform sweeps down and up the layered graph, which render nodes at each level in an attempt to obtain a better solution with a reduced number of crossings. If the number of edge crossings for a candidate graph is lower than a current best graph with the lowest number of crossings, then the candidate graph becomes the current best graph. When optimizations are finished, a current best graph is used as the graph with a minimized number of crossings.

Currently used algorithms calculate a number of crossings for an entire graph before the comparison between the candidate and current best graph is evaluated. This can be inefficient, as calculations for the total number of crossings of a candidate graph are performed, even after it is mathematically apparent that the candidate graph will include more crossings than the current best graph.

BRIEF DESCRIPTION OF THE SEVERAL VIEWS OF THE DRAWINGS

FIG. 1 is a schematic diagram of a system for drawing graphs having a minimized number of edge crossings in accordance with an embodiment of the inventive arrangements disclosed herein.

DETAILED DESCRIPTION

Figure 2:
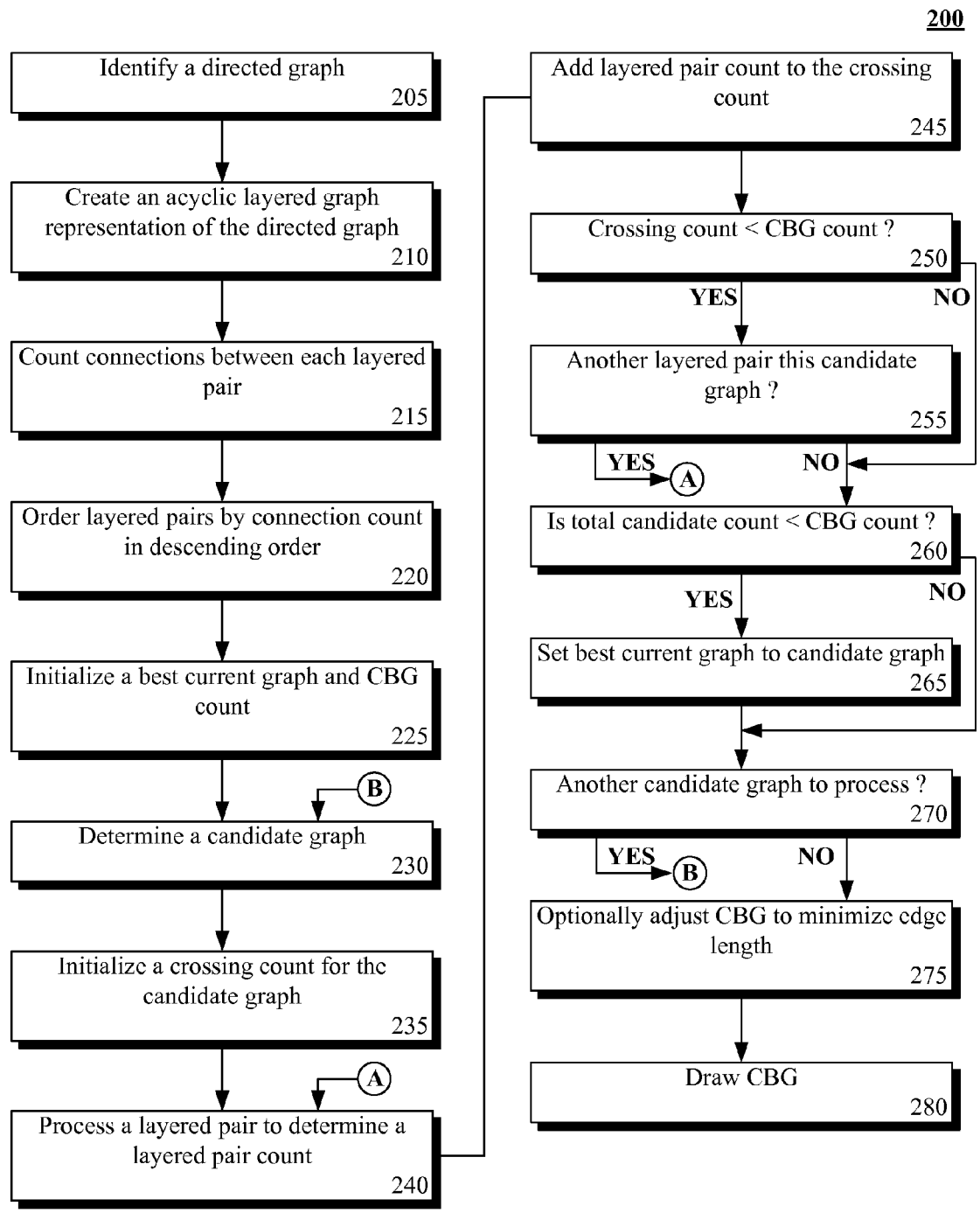
FIG. 2 is a flow chart of a method for drawing graphs having a minimized number of edge crossings in accordance with an embodiment of the inventive arrangements disclosed herein.

The disclosure determines as early as possible during a crossing point computation whether a candidate graph is likely to have fewer crossing points than a current best graph. As a candidate crossing count is determined, it is compared against a current best graph count. Processing stops immediately when the candidate count equals or exceeds the current best graph count, which saves needless processing since the candidate graph will not replace the current best graph.

In one embodiment, the pairs of levels can be ordered, so that those level pairs likely to have the most crossing points are calculated first for each candidate graph. For example, it can be assumed that for most acyclic, layered graphs, most edge crossings will occur in those pairs of levels in which there are the most connections. Thus, the level pairs can be ordered by connection quantity.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram of a system 100 for drawing graphs having a minimized number of edge crossings in accordance with an embodiment of the inventive arrangements disclosed herein.

In system 100, a directed graph 141 can be processed by a graph drawing engine 122 in order to render 142 a drawn graph 144. Example 140 provides a sample illustration of this and is not intended to limit the disclosure in any fashion. The drawn graph 144 can include a set of nodes 145 (e.g., Nodes A-E in drawn graph 144), which are connected by a set of directed edges 146 denoting various relationships between the nodes 145.

The graph drawing engine 122 can utilize a heuristic approach that involves an acyclic layered graph representation of the directed graph 141. For example, in one embodiment, graph drawing engine 122 can produce drawn graph 144 using a modified Sugiyama algorithm. The modification is that a crossing minimizer 125 can be configured to reject candidate graphs as soon as a crossing point count exceeds a current crossing point count of a current best graph. In one embodiment, layer pairs can be ordered so that those likely to have the greatest number of edge crossings are processed first. This minimizes a number of layer pairs that need to be evaluated in many cases.

Sample code 160 describes a stage that is performed once per graph rendering. Code 160 represents one contemplated manner of ordering layered pairs so that those layered pairs having a highest quantity of edge crossings are processed first. Code 160 assumes that those layered pairs having the greatest number of connections between nodes are the layers most likely to have the greatest number of edge crossings. Code assumes that a directed graph 141 is internally represented as a list of pairs of levels. That is, before code 160 executes, a graph transformer 124 can convert a directed graph 141 into an acyclic, layered graph, such as a (k, 2) partite graph. Before code 160 executes, each level can contain a set of nodes in an initially indeterminate order.

According to sample code 160, a clone of each list of level pairs can be created. For each level pair of the cloned list of level pairs, a number of connections between the two levels can be counted. A number of connections between the two levels can then be assigned to each level pair. The level pairs can be sorted or ordered in descending order from a greatest number of connections to a least number of connections.

In one embodiment, an enhancement to code 160 can be included so that a hierarchical graph does not include a first level pair in the list of sorted level pairs. In other words, the edge crossings between the root node and the first level of nodes are not counted, because no edge crossings can exist between the root node and the first level of nodes.

Sample code 165 can execute whenever a graph layout algorithm (contained in crossing minimizer 125) needs to determine whether a candidate graph is better (i.e., have less edge crossings) than a current best graph. As shown, a count of edge crossings for the candidate is to accumulate, until the count equals or exceeds a crossing count of the current best graph. At this point, a counting of the edge crossings for the candidate is halted, and the candidate is discarded since the current best graph has a lower crossing count than the discarded candidate does.

More specifically, code 165 shows that a total number of crossings for a candidate can be initialized at zero. For each ordered (as per code 160) level pair in the layered graph, a number of crossings between the two levels can be performed. The crossings per level pair can be added to the total number of crossings for the candidate. If the total number of crossings exceeds the number of crossings for the best graph, the for-loop can be immediately exited (and the candidate can be discarded). Otherwise, the for-loop can continue for the next ordered level pair.

Once a crossing minimizer 125 completes and determines a best graph (one having a minimum number of edge crossings), a position adjuster 126 can optionally execute. The position adjuster 126 can adjust or manipulate a horizontal position of each node 145 to reduce a length of edges for aesthetic purposes. Graph drawer 127 can then draw the graph (producing drawn graph 144, for example).

The graph drawing engine 122 can be a software/firmware component 120 executed on a computing device 110 including hardware 112. In one embodiment, engine 122 can be a component of a graphic editor 130. The software/firmware 120 can be stored in a non-volatile memory 117 or a volatile memory 116 connected to one or more processors 114 via a bus 115. The processor 114 can read and execute programmatic instructions of the software/firmware 120. The programmatic instructions can include a variation of sample code 160 and sample code 165.

It should be appreciated that the sample code 160, 165 shown in system 100 is for illustrative purposes only and is not to be construed as a limitation of the disclosure. Derivatives and adjustments to the code 160, 165 are expected for different implementation situations. A salient characteristic of code 160 is an ordering of level pairs before processing, where the ordering is from highest expected edge crossing to lowest. A salient characteristic of code 165 is that a count of the number of edge crossings of a candidate graph is halted at an intermediate stage (before a total count of the edge crossing is determined) whenever an intermediate crossing count is at least as high as a count associated with a current best graph.

FIG. 2 is a flow chart of a method 200 for drawing graphs having a minimized number of edge crossings in accordance with an embodiment of the inventive arrangements disclosed herein. Method 200 can be performed in context of system 100.

Method 200 can begin in step 205, where a directed graph can be identified. In step 210, an acyclic layered graph representation of the directed graph can be created. In one embodiment, cycles can be removed by reversing and marking edges that cause the cycles. Dummy nodes can be inserted to ensure that no edges span more than one node. Hence, the acyclic layered graph can be a (k, 2)-partite graph. That is, the graph can include k layers and each layer can have edges only to the layers adjacent to it (i.e., above and below it).

In step 215, connections between each layered pair can be counted. The layered pairs can be ordered by connection count in descending order, as shown by step 220. In step 225, variables for a current best graph and a current best graph (CBG) count can be initialized. The CBG count can represent a number of edge crossings present in the current best graph.

A candidate graph can be determined in step 230. In step 235, a crossing count for the candidate graph can be initiated. In step 240, a layered pair (starting with the ordered pair having the greatest connection count) can be processed to determine a layered pair count. The layered pair count can be added to the crossing count, as shown by step 245. When the crossing count is less than the CBG count and when another layered pair exists for the candidate graph, the method can loop back to step 240, where the next ordered layered pair can be processed.

When in step 250, the crossing count for the candidate graph is greater than or equal to the CBG count, the method can proceed from step 250 to step 260. This exit can occur before crossing counts for all layered pairs is determined, since the candidate graph will not replace the current best graph regardless of the additional processing due to the crossing count of the candidate graph at this intermediate processing point.

After all layered pairs are processed or an exit occurs, step 260 can execute. When the candidate count is less than the CBG count, then the best current graph can be set to the candidate graph, as shown by step 265. Otherwise, the method can proceed to step 270, where a check for another candidate graph can be made. When other candidate graphs are to be evaluated, the method can proceed from step 270 to step 230, where a next candidate graph can be determined and processed. Once all candidate graphs are processed, an optional adjustment of the current best graph can be made to minimize edge length, as shown by step 275. The current best graph, which is a graph having a minimized number of crossing edges, can be drawn in step 280.

The flowchart and block diagrams in the FIGS. 1-2 illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for optimizing a directional graph computation comprising:
    initializing, at a computing device, a candidate graph crossing point counter, wherein the candidate graph is an acyclic, layered graph representation of a directional graph, wherein the layered graph comprises a plurality of level pairs, and wherein a sum of the set of crossing point totals per level pair for the plurality of level pairs equals the crossing point total for the layered graph;
    while the candidate graph crossing point counter is at an intermediate value and before the crossing point total is calculated for the candidate graph, determining, at the computing device, that the intermediate value is at least as great as a crossing point total of a best current graph for the directional graph; and
    responsive to the determination, halting calculation, at the computing device, of the candidate graph crossing point total at the intermediate value and discarding the candidate graph from a possibility of being a graph having a minimized number of crossings during a determination of a graph drawing for the directional graph, where the graph drawing is a heuristic approximation of a graph drawing for the directional graph having a minimized number of edge crossings.

2. The method of claim 1, further comprising:
    repeating, at the computing device, the initializing of the candidate graph crossing point, the determining that the intermediate value before the crossing point total is calculated, and the halting of the calculation of the candidate graph crossing point total at the intermediate value a plurality of times for different candidate graphs during the heuristic approximation of the graph drawing.

3. The method of claim 1, further comprising:
    computing, at the computing device, a crossing point counter total for a different candidate graph;
    determining, at the computing device, the crossing point counter total is less than the crossing point total of the best current graph; and
    making, at the computing device, the different candidate graph the best current graph for the directional graph during a heuristic determination of the graph drawing for the directional graph.

4. The method of claim 1, wherein the heuristic determination is based upon a Sugiyama algorithm.

5. The method of claim 1, further comprising:
    ordering, at the computing device, the level pairs before beginning a calculation for the crossing point total for the candidate graph, wherein the ordering is to predict an expected number of crossing points per level pair, wherein calculation of the level pairs is ordered from the level pairs likely to have the greatest crossing points per level pair to the level pairs likely to have the least crossing points per level pair.

6. The method of claim 5, wherein the ordering of the level pairs is based upon a number of connections between the level pairs.

7. The method of claim 1, further comprising:
    determining, at the computing device, that the directional graph is a hierarchical graph; and
    excluding, at the computing device, a level pair comprising a level for the root node and a first level of nodes of the hierarchical graph from computations involving the candidate graph crossing point counter and assuming zero crossing points exist for the excluded level pair.

8. A computer program product for optimizing a directional graph computation comprising a non-transitory computer readable storage medium having computer usable program code embodied therewith, the computer usable program code comprising:

computer usable program code electronically stored in the non-transitory storage medium that is executable by a processor to initialize a candidate graph crossing point counter, wherein the candidate graph is an acyclic, layered graph representation of a directional graph, wherein the layered graph comprises a plurality of level pairs, and wherein a sum of the set of crossing point totals per level pair for the plurality of level pairs equals the crossing point total for the layered graph;

computer usable program code electronically stored in the non-transitory storage medium that is executable by a processor to determine, while the candidate graph crossing point counter is at an intermediate value and before the crossing point total is calculated for the candidate graph, that the intermediate value is at least as great as a crossing point total of a best current graph for the directional graph; and computer usable program code electronically stored in the non-transitory storage medium that is executable by a processor to, responsive to the determination, halt calculation of the candidate graph crossing point total at the intermediate value and discarding the candidate graph from a possibility of being a graph having a minimized number of crossings during a determination of a graph drawing for the directional graph, where the graph drawing is a heuristic approximation of a graph drawing for the directional graph having a minimized number of edge crossings.

9. The computer program product of claim 8, further comprising:

computer usable program code electronically stored in the non-transitory storage medium that is executable by a processor to repeat the initializing of the candidate graph crossing point, the determining that the intermediate value before the crossing point total is calculated, and the halting of the calculation of the candidate graph crossing point total at the intermediate value a plurality of times for different candidate graphs during the heuristic approximation of the graph drawing.

10. The computer program product of claim 8, further comprising:

computer usable program code electronically stored in the non-transitory storage medium that is executable by a processor to compute a crossing point counter total for a different candidate graph;

computer usable program code electronically stored in the non-transitory storage medium that is executable by a processor to determine the crossing point counter total is less than the crossing point total of the best current graph; and computer usable program code electronically stored in the non-transitory storage medium that is executable by a processor to make the different candidate graph the best current graph for the directional graph during a heuristic determination of the graph drawing for the directional graph.

11. The computer program product of claim 8, wherein the heuristic determination is based upon a Sugiyama algorithm.

12. The computer program product of claim 8, further comprising:

computer usable program code electronically stored in the non-transitory storage medium that is executable by a processor to order the level pairs before beginning a calculation for the crossing point total for the candidate graph, wherein the ordering is to predict an expected number of crossing points per level pair, wherein calculation of the level pairs is ordered from the level pairs likely to have the greatest crossing points per level pair to the level pairs likely to have the least crossing points per level pair.

13. The computer program product of claim 12, wherein the ordering of the level pairs is based upon a number of connections between the level pairs.

14. The computer program product of claim 8, further comprising:

computer usable program code electronically stored in the non-transitory storage medium that is executable by a processor to determine that the directional graph is a hierarchical graph; and computer usable program code electronically stored in the non-transitory storage medium that is executable by a processor to exclude a level pair comprising a level for the root node and a first level of nodes of the hierarchical graph from computations involving the candidate graph crossing point counter and assuming zero crossing points exist for the excluded level pair.

15. A system for drawing directional graphs comprising:

one or more processors;

a non-transitory storage medium that electronically stores program instructions able to be executed by the one or more processors; and a graph drawing engine comprising at least a subset of the program instructions contained in the non-transitory storage medium configured to graphically render a directional graph having a minimized number of edge crossings between edges connecting nodes, wherein the graph drawing engine internally represents the directional graph as a layered graph comprising a plurality of level pairs, wherein the layered graph has no cycles and only has edges between adjacent levels, wherein the graph drawing engine repetitively evaluates candidate graphs and selects one of the candidate graphs with a lowest crossing point total, wherein the selected candidate graph is used to draw a graph representing the directional graph, and wherein the graph drawing engine interrupts computations for crossing point totals before a crossing point total is determined of each of the candidate graphs when an intermediate crossing point total for that candidate graph is at least as great as a crossing point total for a current best graph against which the candidate graph is being compared.

16. The system of claim 15, wherein the graph drawing engine performs a heuristic determination for the selected candidate graph based upon a Sugiyama algorithm.

17. The system of claim 15, wherein the graph drawing engine is configured to order level pairs based upon a number of connections between levels in descending order, wherein the ordered level pairs are processed in order when determining a crossing point total for each candidate graph.

* * * * *